United States Patent [19]
Wade

[11] Patent Number: 5,351,484
[45] Date of Patent: Oct. 4, 1994

[54] LIGHT-OFF CATALYST MONITOR

[75] Inventor: Wallace R. Wade, Farmington Hills, Mich.

[73] Assignee: Ford Motor Company, Dearborn, Mich.

[21] Appl. No.: 167,301

[22] Filed: Dec. 16, 1993

[51] Int. Cl.5 ............................................. F01N 3/20
[52] U.S. Cl. ........................................ 60/274; 60/276; 60/277
[58] Field of Search ............... 60/273, 274, 276, 277, 60/290, 291, 297

[56] References Cited

U.S. PATENT DOCUMENTS

| | | | |
|---|---|---|---|
| 3,699,683 | 10/1972 | Tourtellotte | 60/297 |
| 3,783,619 | 1/1974 | Alquist | 60/291 |
| 5,083,427 | 1/1992 | Anderson | 60/276 |
| 5,159,810 | 11/1992 | Grutter et al. | 60/274 |
| 5,259,189 | 11/1993 | Baier et al. | 60/277 |
| 5,267,472 | 12/1993 | Schneider | 60/277 |

Primary Examiner—Richard R. Cole
Assistant Examiner—Daniel J. O'Connor
Attorney, Agent, or Firm—Peter Abolins; Roger L. May

[57] ABSTRACT

Monitoring a light-off catalyst in conjunction with an internal combustion engine includes providing exhaust gas oxygen sensors upstream and downstream of the light-off catalyst for monitoring operation of the catalyst. The monitoring is disabled when the mass air flow through the light-off catalyst is so high that the catalyst monitor is saturated and unable to detect the operation of the light-off catalyst.

8 Claims, 1 Drawing Sheet

LIGHT-OFF CATALYST MONITOR

BACKGROUND OF THE INVENTION

1. Field of the Invention

This invention relates to electronic engine control and diagnostics for an internal combustion engine.

2. Prior Art

Internal combustion engines can have a catalyst in the exhaust path to reduce the occurrence of certain gases coming out of the exhaust path. Further, often it is desirable to determine the operating condition of any such catalysts. In certain low emission vehicles there is a light-off catalyst in the exhaust gas stream which must be monitored for hydrocarbon (HC) efficiency. The light off catalyst is a relatively small, quickly acting catalyst typically used in combination with a large, slower acting main catalyst. However, since the light-off catalyst is usually a very small volume catalyst, the efficiency will be low at the high space velocities experienced over most of the time of engine operation. As a result, an onboard diagnostic monitor for catalyst efficiency will be saturated and cannot detect when the light-off catalyst has deteriorated. It would be desirable to be able to determine when such a catalyst has deteriorated.

SUMMARY OF THE INVENTION

An onboard diagnostic monitor for catalyst efficiency of a low emission vehicle light-off catalyst can use the following steps. First an exhaust gas oxygen (EGO) sensor is provided upstream (front) and downstream (rear) of the light-off catalyst that is being monitored. Second, for mass air flow regions where the space velocity is so high that the catalyst monitor is saturated (unable to detect a high efficiency catalyst or a catalyst with zero efficiency), the catalyst monitor will be disabled. Third, the catalyst monitor will be active only in the mass air flow regions where the space velocity is low and the catalyst monitor is not saturated. Fourth, the EGO switch ratio (rear/front) determined in the capable mass air flow regions can be used to relate the condition of the light-off catalyst to the overall catalyst HC efficiency.

DETAILED DESCRIPTION OF THE INVENTION

Figure 1:
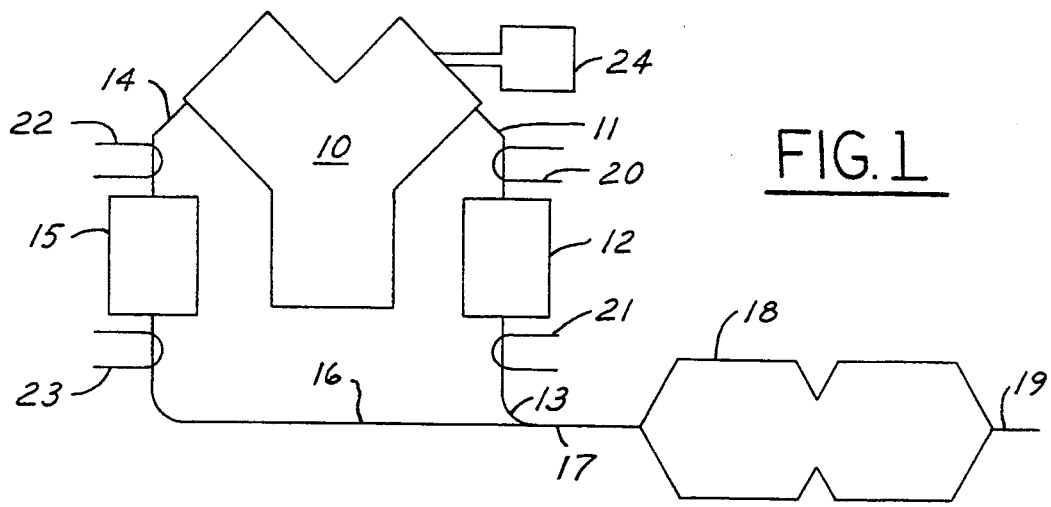
FIG. 1 is a schematic representation of an engine, two light-off catalysts and a main exhaust gas catalyst.

Referring to FIG. 1, an engine 10 has a first exhaust path 11 coupled to a light-off catalyst 12 which in turn is coupled to an exhaust path 13. From another bank of engine 10 an exhaust path 14 is coupled to a light-off catalyst 15 which is coupled to an exhaust path 16. Exhaust paths 16 and 13 combine into an exhaust path 17 which is coupled to a catalyst 18 which in turn is coupled to a final exhaust path 19. An exhaust gas oxygen sensor 20 is positioned in exhaust path 11, an exhaust gas oxygen sensor 21 is positioned in exhaust path 13, an exhaust gas oxygen sensor 22 is positioned in exhaust path 14, and an exhaust gas oxygen sensor 23 is positioned in exhaust path 16. A mass air flow sensor 24 is coupled to engine 10 to detect the air mass going into engine 10.

Figure 2:
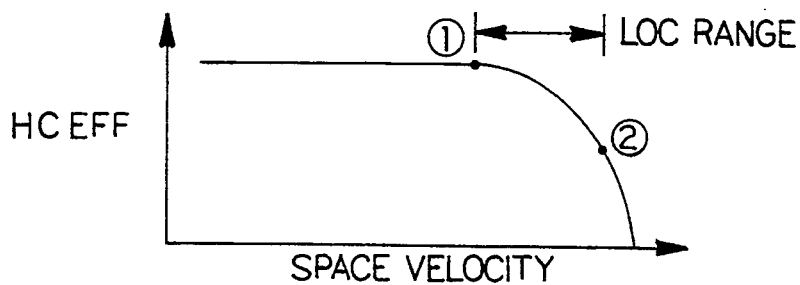
FIG. 2 is a graphic representation of hydrocarbon efficiency of a catalyst versus space velocity.

Referring to FIG. 2, the hydrocarbon efficiency is plotted against the space velocity, which is the reciprocal of how much time the exhaust gas spends in the catalyst. Thus, at a low space velocity there is a high residence time with a great deal of time spent in the catalyst. In contrast, at a high space velocity there is a low residence time so that a small amount of time is spent in the catalyst. Typical operation for a large catalyst is to the left of the point indicated as 1. Thus there are high efficiencies at a low space velocity. However, with a relatively small light-off catalyst, operation tends to take place to the right of point 1 so that there are higher space velocities and reduced hydrocarbon efficiency. This affects the capability of monitoring the catalyst.

In general, the logic of the catalyst monitor is to find out what the oxygen storage capacity of the catalyst is. It is then assumed that the oxygen storage capacity of the catalyst is related to the catalyst efficiency and that this in turn indicates whether or not the catalyst is effectively processing the exhaust gases to reduce undesired emissions. The logic of this monitoring scheme is that the monitoring of the catalyst is only done when the space velocities are sufficiently low so that there is high hydrocarbon efficiency in the catalyst. In the case of a small light-off catalyst, this means monitoring cannot be done during substantial portions of the time of engine operation.

Figure 3:
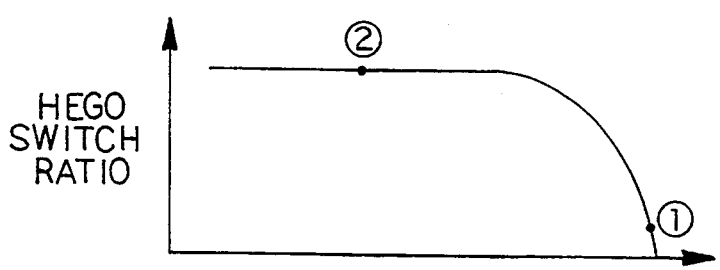
FIG. 3 is a graphic representation of an exhaust gas oxygen switching ratio versus hydrocarbon efficiency.

Referring to FIG. 3, the exhaust gas oxygen switch ratio is plotted against the hydrocarbon efficiency and points labeled 1 and 2 are noted corresponding to points labeled 1 and 2 on FIG. 2. Typically the area around point 1 on FIG. 3 is the operation range of a large volume catalyst. The exhaust gas oxygen sensor switch ratio is the ratio of rear switching to front switching. Therefore when rear switching is very low the EGO switch ratio is very low. Thus near point 1 there is a very low switch ratio and a high hydrocarbon efficiency indicating that there is very effective catalytic action. This would be an example of a new catalyst. In contrast, at a very low hydrocarbon efficiency there is a very high EGO switch ratio which indicates that the ratio of rear to front switching is essentially the same. This is the kind of action that would be expected if there were very poor catalytic action or, in the extreme, a straight pipe connected between the front and rear EGO and no catalytic action occurred in the straight pipe.

Figure 4:
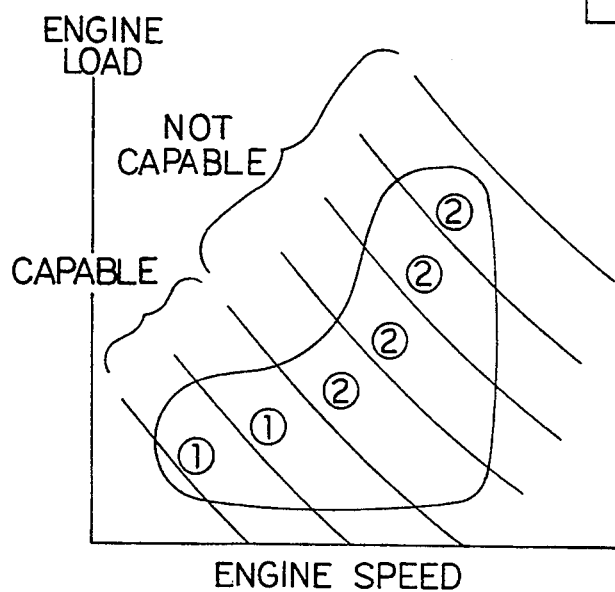
FIG. 4 is a graphic representation of load versus speed for various mass air flow regions of engine operation, including capable regions of mass air flow where catalyst monitoring can be performed and not capable regions of mass air flow where catalyst monitoring can not be performed.

Referring to FIG. 4, the graphic representation of engine load versus engine speed is shown at various mass air flow regions. The partitioning of the graph shows regions where the catalytic monitoring is capable and not capable. Regions numbered 1 on FIG. 4 correlate to the points numbered 1 on FIGS. 2 and 3. Similarly, regions numbered 2 on FIG. 4 correspond to the points numbered 2 on FIGS. 2 and 3. In points 1 the air flow is sufficiently low so that the catalyst does not saturate and effective catalytic monitoring can take place to determine the condition of the catalyst. In contrast, in the points numbered 2 the air flow is too high and catalytic monitoring saturates so that there can be no determination of the operating condition of the catalyst.

Various modifications and variations will no doubt occur to those skilled in the arts to which this invention pertains. Such variations and all other variations which basically rely on the teachings through which this disclosure has advanced the art are properly considered within the scope of this invention.

I claim:

1. A method of monitoring a light-off catalyst in an internal combustion engine vehicle having a light-off catalyst and a main catalyst, including the steps of:

providing an exhaust gas oxygen sensor upstream and downstream of the light-off catalyst for monitoring operation of the catalyst;

disabling monitoring of the light-off catalyst when the mass air flow in the engine is such that the space velocity through the light-off catalyst is so high that catalyst monitoring is saturated and unable to detect efficiency of the light-off catalyst or a catalyst with zero efficiency; and activating monitoring of the light off catalyst when the mass air flow into the engine is such that the space velocity is sufficiently low and the catalyst monitoring is not saturated.

2. A method of monitoring a light-off catalyst as recited in claim 1 wherein monitoring operation of the catalyst includes:

determining the ratio of the frequency of downstream exhaust gas oxygen sensor switching to the frequency of upstream exhaust gas oxygen sensor switching when the mass air flow into the engine is such that catalyst monitoring does not saturate and there can be an indication of overall catalyst hydrocarbon efficiency.

3. A method of monitoring a light-off catalyst as recited in claim 2 further comprising the steps of:

providing a second light-off catalyst from a second bank of the engine;

providing second upstream and downstream exhaust gas oxygen sensors around the second light-off catalyst;

providing a downstream union of the exhaust flow from the two light-off catalysts; and providing a main catalyst downstream of the union of the flow from the light-off catalysts for further catalytic processing.

4. A method of monitoring a light-off catalyst as recited in claim 3 further comprising the step of using a mass air flow sensor to detect air flow into the engine to determine when monitoring can take place.

5. A method of monitoring a light-off catalyst as recited in claim 3 further comprising the step of using engine speed and load to determine when monitoring can take place.

6. Apparatus for monitoring a light-off catalyst including:

an internal combustion engine having at least one bank of exhaust gas output;

an upstream exhaust gas oxygen sensor for detecting exhaust gas from the engine;

a light-off catalyst downstream of the upstream exhaust gas oxygen sensor;

a downstream exhaust gas oxygen sensor downstream of the light-off catalyst;

a main catalyst downstream of the downstream exhaust gas oxygen sensor; and means for determining the occurrence of sufficiently low space velocity through the light-off catalyst so that light-off catalyst efficiency monitoring can be performed.

7. An apparatus as recited in claim 6 wherein said means for determining air flow and space velocity through the light-off catalyst includes a mass air flow sensor.

8. An apparatus as recited in claim 6 wherein said means for determining air flow and space velocity through the light-off catalyst includes using engine speed and load to determine engine air flow.

* * * * *